(12) United States Patent
Grajcar et al.

(10) Patent No.: US 9,675,054 B2
(45) Date of Patent: Jun. 13, 2017

(54) AQUACULTURE LIGHTING DEVICES AND METHODS

(71) Applicant: Once Innovations, Inc., Plymouth, MN (US)

(72) Inventors: Zdenko Grajcar, Orono, MN (US); Julie Delabbio, Natchitoches, LA (US); Kevin Payne, St. Louis Park, MN (US)

(73) Assignee: Once Innovations, Inc., Plymouth, MN (US)

( * ) Notice: Subject to any disclaimer, the term of this patent is extended or adjusted under 35 U.S.C. 154(b) by 0 days.

(21) Appl. No.: 14/805,647

(22) Filed: Jul. 22, 2015

(65) Prior Publication Data

US 2016/0021855 A1    Jan. 28, 2016

Related U.S. Application Data

(60) Provisional application No. 62/027,348, filed on Jul. 22, 2014.

(51) Int. Cl.
*A01K 61/00* (2017.01)

(52) U.S. Cl.
CPC .................................. *A01K 61/00* (2013.01)

(58) Field of Classification Search
CPC .......................... A60K 61/00; F21V 33/0064
See application file for complete search history.

(56) References Cited

U.S. PATENT DOCUMENTS

| | | | |
|---|---|---|---|
| 3,916,832 A | 11/1975 | Sweeney | |
| 3,998,186 A | 12/1976 | Hodges | |
| 5,027,550 A | 7/1991 | Mori | |
| 5,778,823 A | 7/1998 | Adey et al. | |
| 6,030,108 A | 2/2000 | Ishiharada et al. | |
| 6,044,798 A * | 4/2000 | Foster .................. | A01K 61/007 119/223 |
| 6,192,833 B1 | 2/2001 | Brune et al. | |
| 6,447,681 B1 | 9/2002 | Carlberg et al. | |
| 6,851,387 B2 | 2/2005 | Untermeyer et al. | |
| 7,287,488 B2 | 10/2007 | Taylor et al. | |

(Continued)

FOREIGN PATENT DOCUMENTS

| | | |
|---|---|---|
| EP | 1508272 A1 | 2/2005 |
| JP | 6268591 A | 3/1987 |
| WO | WO-2014039823 A1 | 3/2014 |

OTHER PUBLICATIONS

"U.S. Appl. No. 14/425,332, Preliminary Amendment filed Mar. 3, 2015", 3 pgs.

(Continued)

*Primary Examiner* — Karabi Guharay
(74) *Attorney, Agent, or Firm* — Schwegman Lundberg & Woessner, P.A.

(57) ABSTRACT

Lighting assemblies that provide spectrum specific underwater lighting to aquatic life. Each assembly has a vessel that receives a substrate secured to a heatsink and is enclosed by an end cap that provides a water tight seal. The end cap is sealingly secured to the vessel by a sealing element and has opening disposed therethrough for receiving an electrical connector that electrically connects lighting elements on the substrate to an exterior power source. The connector is sealingly disposed through the opening in the end cap to prevent the ingress of water within the vessel.

3 Claims, 10 Drawing Sheets

(56) References Cited

U.S. PATENT DOCUMENTS

| | | | |
|---|---|---|---|
| 8,373,363 | B2 | 2/2013 | Grajcar |
| 8,531,136 | B2 | 9/2013 | Grajcar |
| 8,593,044 | B2 | 11/2013 | Grajcar |
| 8,643,308 | B2 | 2/2014 | Grajcar |
| 8,950,361 | B1 | 2/2015 | Pierce |
| 2002/0191396 | A1* | 12/2002 | Reiff ................ F21L 4/04 362/246 |
| 2004/0107914 | A1 | 6/2004 | Untermeyer et al. |
| 2005/0029178 | A1 | 2/2005 | Haddas |
| 2005/0120970 | A1 | 6/2005 | Massingill et al. |
| 2007/0268702 | A1* | 11/2007 | McFadden .......... F21V 29/004 362/294 |
| 2008/0173249 | A1 | 7/2008 | Miller |
| 2009/0050067 | A1 | 2/2009 | Parsons et al. |
| 2010/0081835 | A1 | 4/2010 | Wu et al. |
| 2010/0236137 | A1 | 9/2010 | Wu et al. |
| 2010/0267126 | A1 | 10/2010 | Jacobs et al. |
| 2011/0045564 | A1 | 2/2011 | Dhamwichukorn |
| 2011/0109244 | A1 | 5/2011 | Grajcar |
| 2011/0122645 | A1 | 5/2011 | Donham et al. |
| 2011/0210678 | A1 | 9/2011 | Grajcar |
| 2011/0273098 | A1 | 11/2011 | Grajcar |
| 2012/0117869 | A1 | 5/2012 | Javan et al. |
| 2012/0129245 | A1 | 5/2012 | Neeb et al. |
| 2012/0268918 | A1 | 10/2012 | Grajcar |
| 2012/0312243 | A1 | 12/2012 | Rusch |
| 2013/0118414 | A1 | 5/2013 | Komada et al. |
| 2013/0152864 | A1 | 6/2013 | Grajcar et al. |
| 2013/0174792 | A1 | 7/2013 | Delabbio |
| 2015/0150195 | A1 | 6/2015 | Grajcar |
| 2015/0237890 | A1 | 8/2015 | Grajcar |
| 2016/0037756 | A1 | 2/2016 | Grajcar et al. |

OTHER PUBLICATIONS

"International Application Serial No. PCT/US2013/058511, International Preliminary Report on Patentability mailed Mar. 19, 2015", 7 pgs.

"International Application Serial No. PCT/US2013/058511, International Search Report mailed Dec. 4, 2013", 3 pgs.

"International Application Serial No. PCT/US2013/058511, Written Opinion mailed Dec. 4, 2013", 5 pgs.

"U.S. Appl. No. 14/425,332, Final Office Action mailed Nov. 25, 2016", 14 pgs.

"U.S. Appl. No. 14/425,332, Non Final Office Action mailed Jun. 8, 2016", 13 pgs.

"U.S. Appl. No. 14/425,332, Response filed Nov. 8, 2016 to Non Final Office Action mailed Jun. 8, 2016", 9 pgs.

* cited by examiner

AQUACULTURE LIGHTING DEVICES AND METHODS

CLAIM OF PRIORITY

This application is based upon and claims benefit of priority to U.S. Provisional Patent Application Ser. No. 62/027,348, filed Jul. 22, 2014, entitled "Aquaculture Lighting Devices and Methods", which is incorporated by reference herein in full.

BACKGROUND

Lighting can be used to affect the growth of aquatic animals. Specifically, light is needed for growth of most animal species and substantially affects the animals' behavior in terms of feeding, reproducing, location in the water column, and other factors. Water naturally filters light as the water gets deeper, such that lower light intensity and a different spectrum of light wavelengths reaches deep water.

In aquaculture, carbon dioxide ($CO_2$) and oxides of nitrogen contaminate the water and create an environment that is lethal to certain animals. In nature, algae in the water can consume both $CO_2$ and nitrogen in the course of algae growth and photosynthesis; in so doing, the algae decontaminates the water while providing food to the animals. In order to use algae for such purposes, however, light needs to be present at proper frequencies and intensities to allow the algae to grow using photosynthesis. The quantity of light available in a water pond may be reduced by: 1) less than ideal periods of sunlight being present during a 24 hour solar cycle to permit photosynthesis to take place as may be desired; 2) the reflective nature of the water surface, which reflectance reduces the beneficial effect of available light on photosynthesis, and which reflectance changes as the angle of the sun to the water moves from acute to oblique as the day progresses, thus inhibiting photosynthesis, and 3) the fact that water containing high levels of solids (whether in the form of decaying or living matter, such as decaying or living algae) does not permit light to reach much beyond the surface. When the light in a water pond is reduced, photosynthesis can be reduced or become impossible, and the benefits of photosynthesis may be absent at any depth much below the surface. As such, the use of deeper water levels in aquaculture facilities may prove to be problematic.

Small ponds have several factors which inhibit light penetration into the pond, including lack of wave action, as the smaller body of water is more protected and picks up less wind energy. Without wave action, more light is reflected off of the surface of the water and does not penetrate into the pond (in contrast, with constant wave action, the sun's rays are only reflected a portion of the time and less of the sunlight is reflected as the continuously changing surface does not create a smooth reflective surface). Some measurements estimate that on a smooth surface pond, only 40% of the light energy penetrates the surface of the water. After a certain point, beyond the critical angle, all of the light is reflected off the surface and it becomes dark underwater (although it is still light above the water).

Protection also reduces the clearing of the water surface, and algae or other materials may come to rest on the surface and cloud the surface, which otherwise might have been blown from the surface of the pond and/or dissipated into a larger body of water. The animals may need to have different spectra of light passed to them for different depths of water. For example, a fish whose habitat is within a one meter depth from the surface of a pond may thrive with a different light spectrum than a fish whose habitat is deeper within the pond (e.g., at a depth of 10 meters).

Further, studies have shown that different living organisms are both physiologically and psychologically affected by the wavelength of light they receive. This holds true whether the living organism is a plant or animal as is discussed in several patent applications by the present inventor; including U.S. Patent Publication no. 2015/0150195 entitled "LIGHT SOURCES ADAPTED TO SPECTRAL SENSITIVITY OF PLANTS" and U.S. patent application Ser. No. 14/425,332 entitled "SYMBIOTIC SHRIMP AND ALGAE GROWTH SYSTEM", both of which are incorporated in full herein.

OVERVIEW

This invention is related to LED Lighting Assemblies. More specifically, this invention relates to an underwater LED lighting assembly for enhancing aquaculture in natural and man-made ecosystems.

A need in the art exists for an underwater lighting assembly that can be used to enhance and grow aquatic life in its natural habitat and also in man-made facilities. Further a need in the art exists to increase the yield, size and capacity for aquatic life.

Therefore, a principle object of the present invention is to provide a submergible LED lighting assembly for aquatic life. Yet another object of the present invention is to optimize the growth and yield of aquatic life. Another object of the present invention is to provide additional locations in which aquatic life can be grown for harvesting. These and other objects, features and advantages will become apparent from the specification and claims.

Lighting assemblies having a vessel that provides underwater lighting to aquatic life, including wavelength specific lighting. The vessel has an enclosed interior with an open end that receive a heat sink having a substrate engaged thereto. The substrate contains driving circuitry and lighting elements that are surrounding by the sidewall of the vessel. The open end is sealingly enclosed by an end cap in a manner to provide a water tight seal between the vessel and end cap. In addition the end cap has openings disposed therethrough for receiving electrical connectors that are disposed through the end cap and into the vessel to provide an electrical connection to the substrate to provide power to the lighting elements. The connectors are disposed through the end cap in a sealing connection to ensure no ingress of water occurs within the vessel. The connectors are attached to buoys within the water to allow the vessel to be within the water without engaging the bottom of the body of water housing the vessel.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
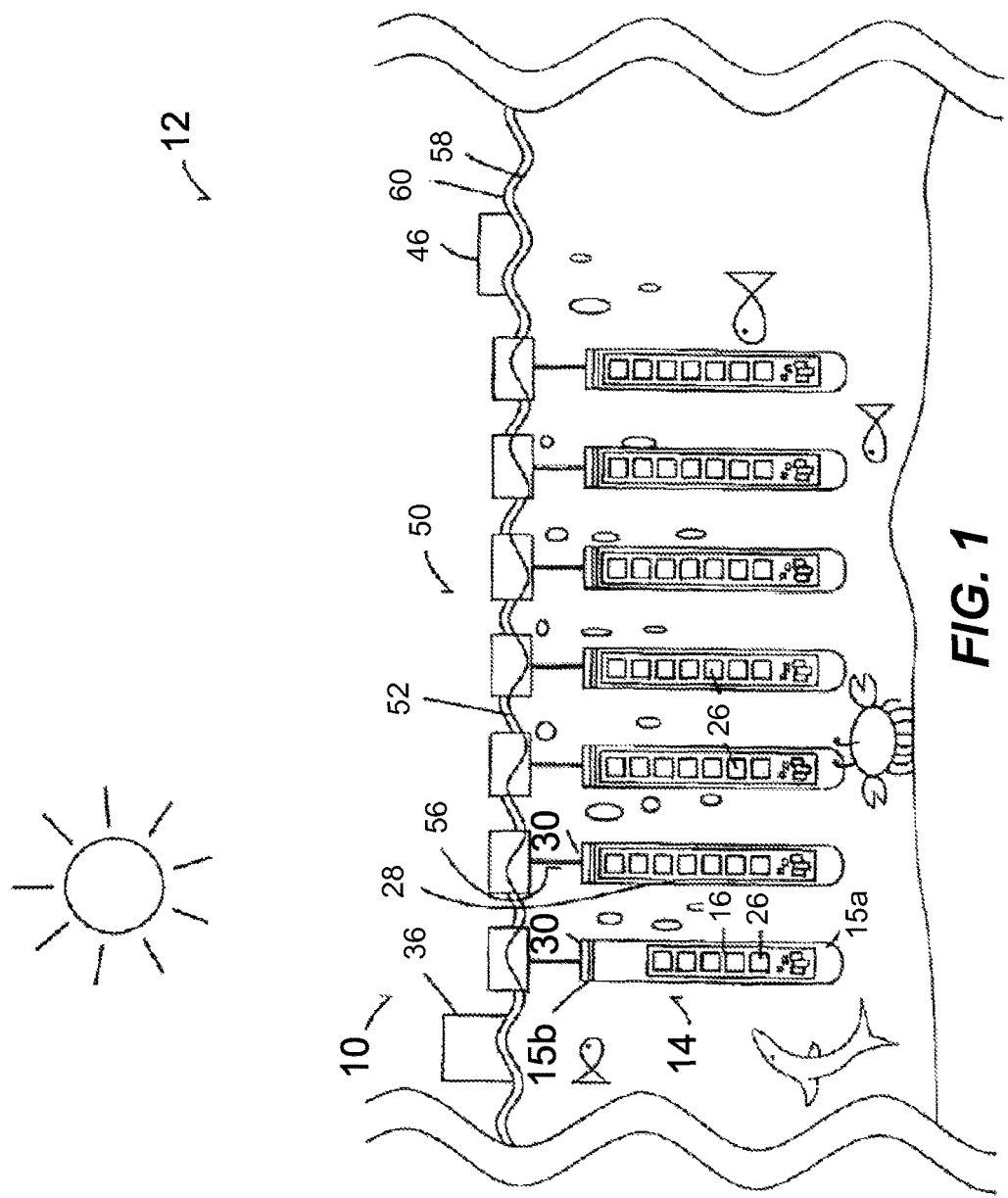
FIG. 1 is a side plan view of a lighting assembly within an ecosystem.
Figure 2:
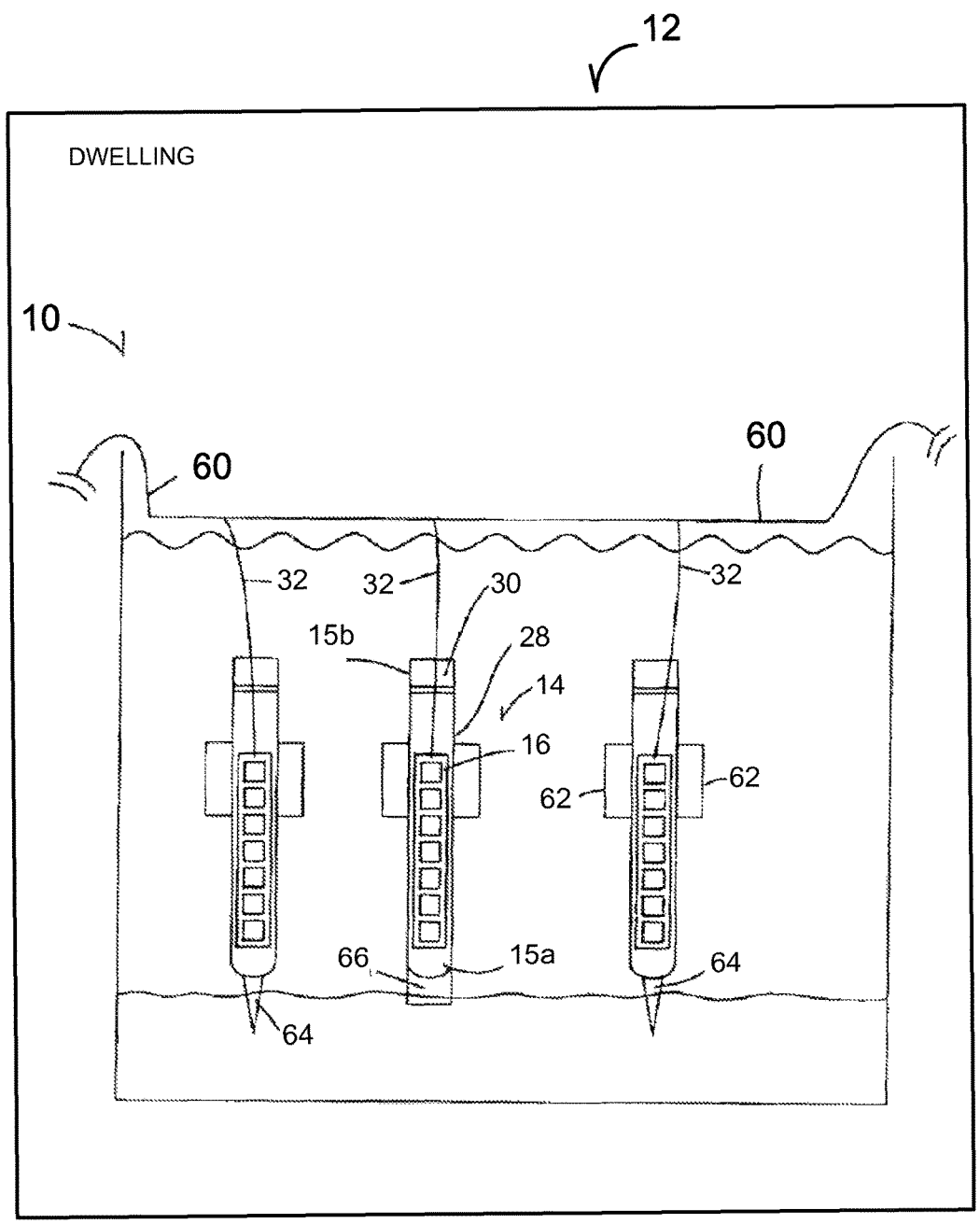
FIG. 2 is a side plan view of a lighting assembly within an ecosystem.
Figure 3:
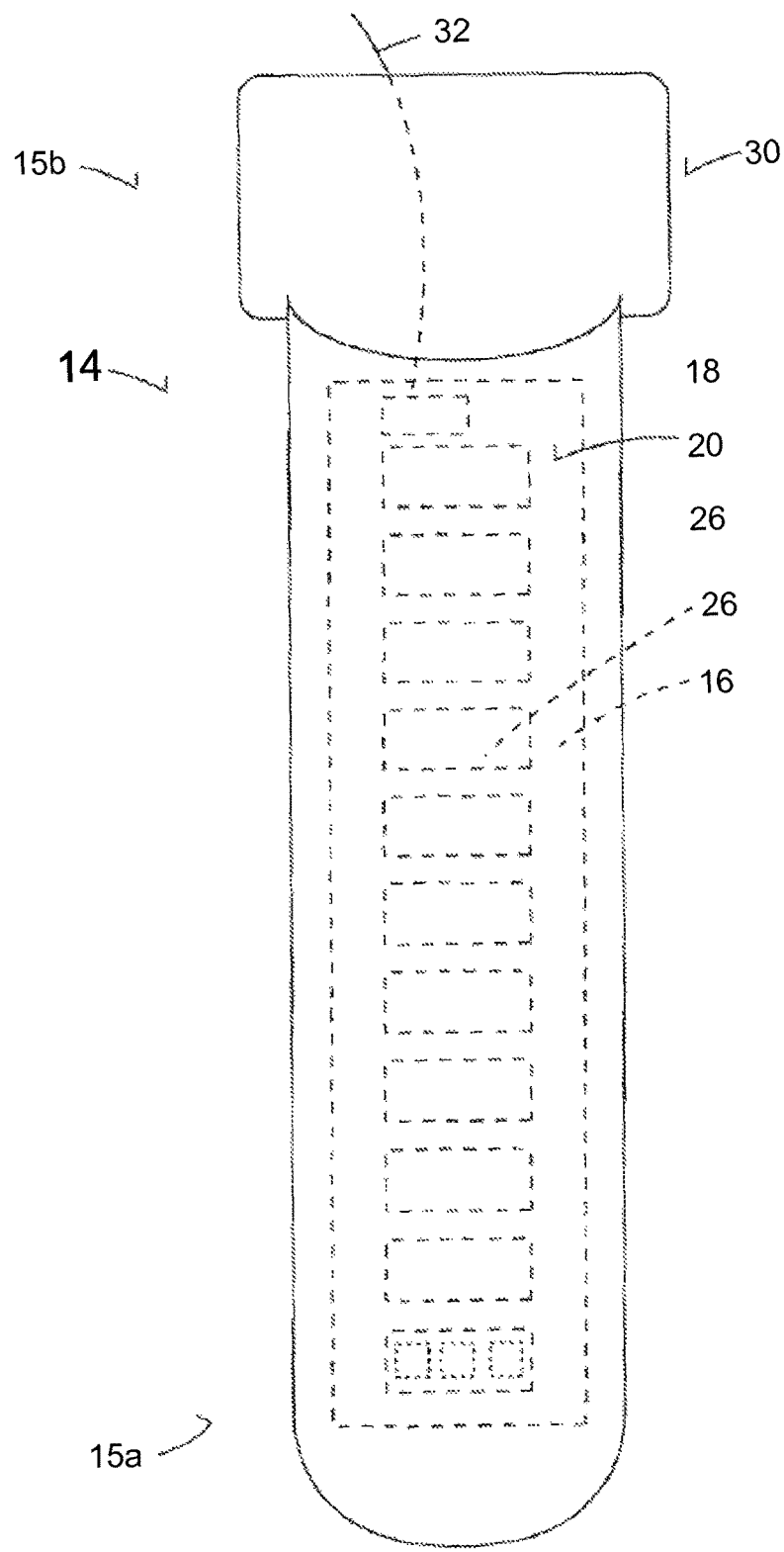
FIG. 3 is a side plan view of a lighting assembly, with hidden lines, for use in an ecosystem.
Figure 4:
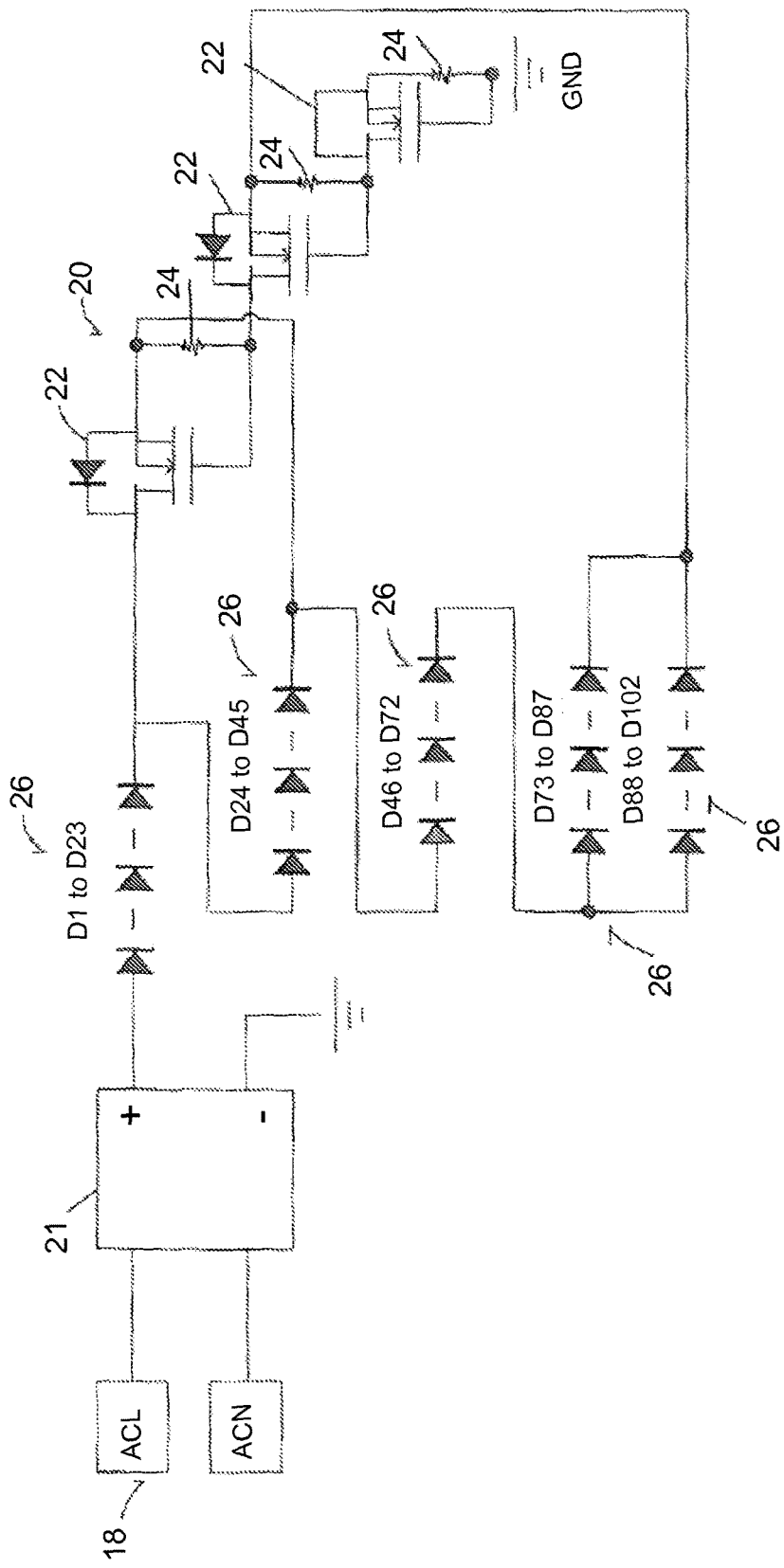
FIG. 4 is a schematic diagram of a lighting assembly for use in an ecosystem.
Figure 5:
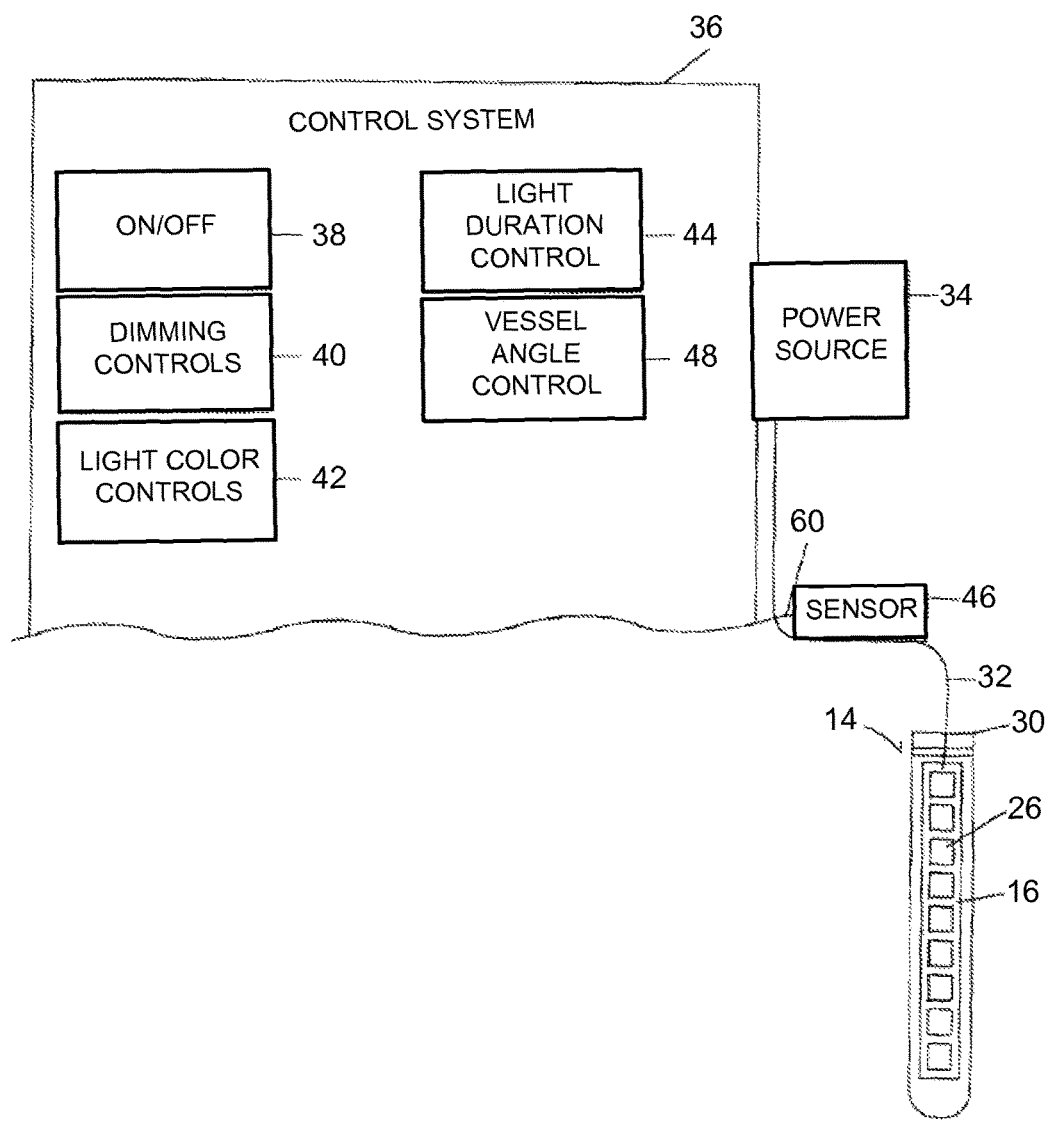
FIG. 5 is a schematic diagram of a lighting assembly with a control assembly for use in an ecosystem.
Figure 6:
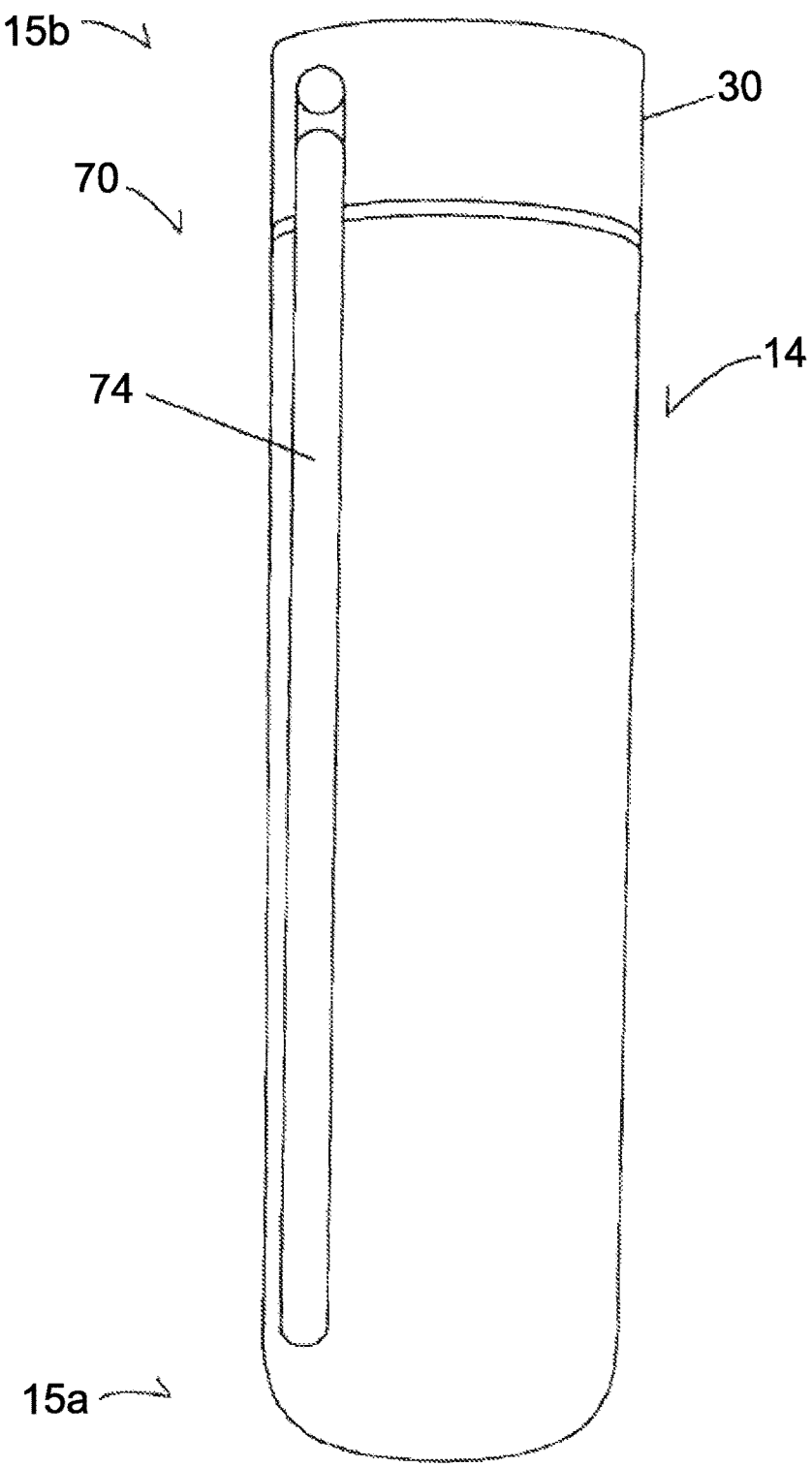
FIG. 6 is a side plan view of a lighting assembly with a cleaning assembly.
Figure 7:
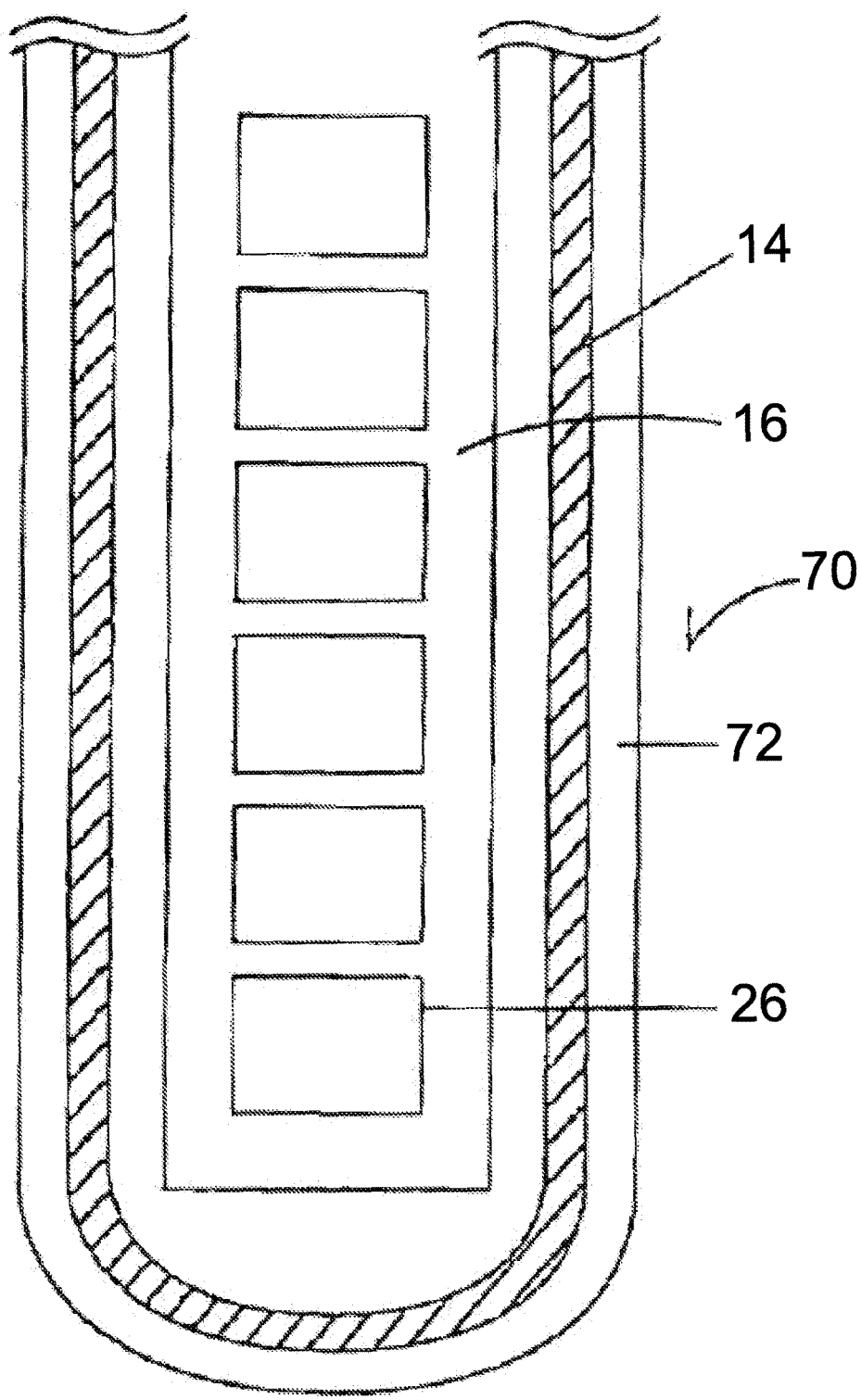
FIG. 7 is a sectional view of a lighting assembly.
Figure 8:
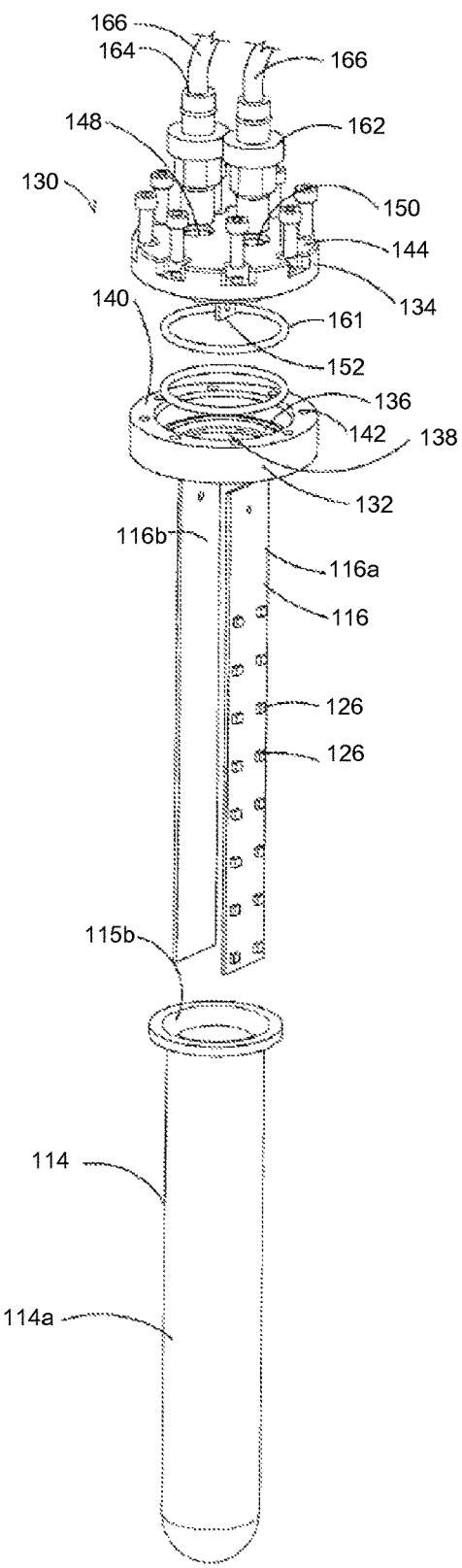
FIG. 8 is an exploded perspective view of a lighting assembly for use in an ecosystem.
Figure 9:
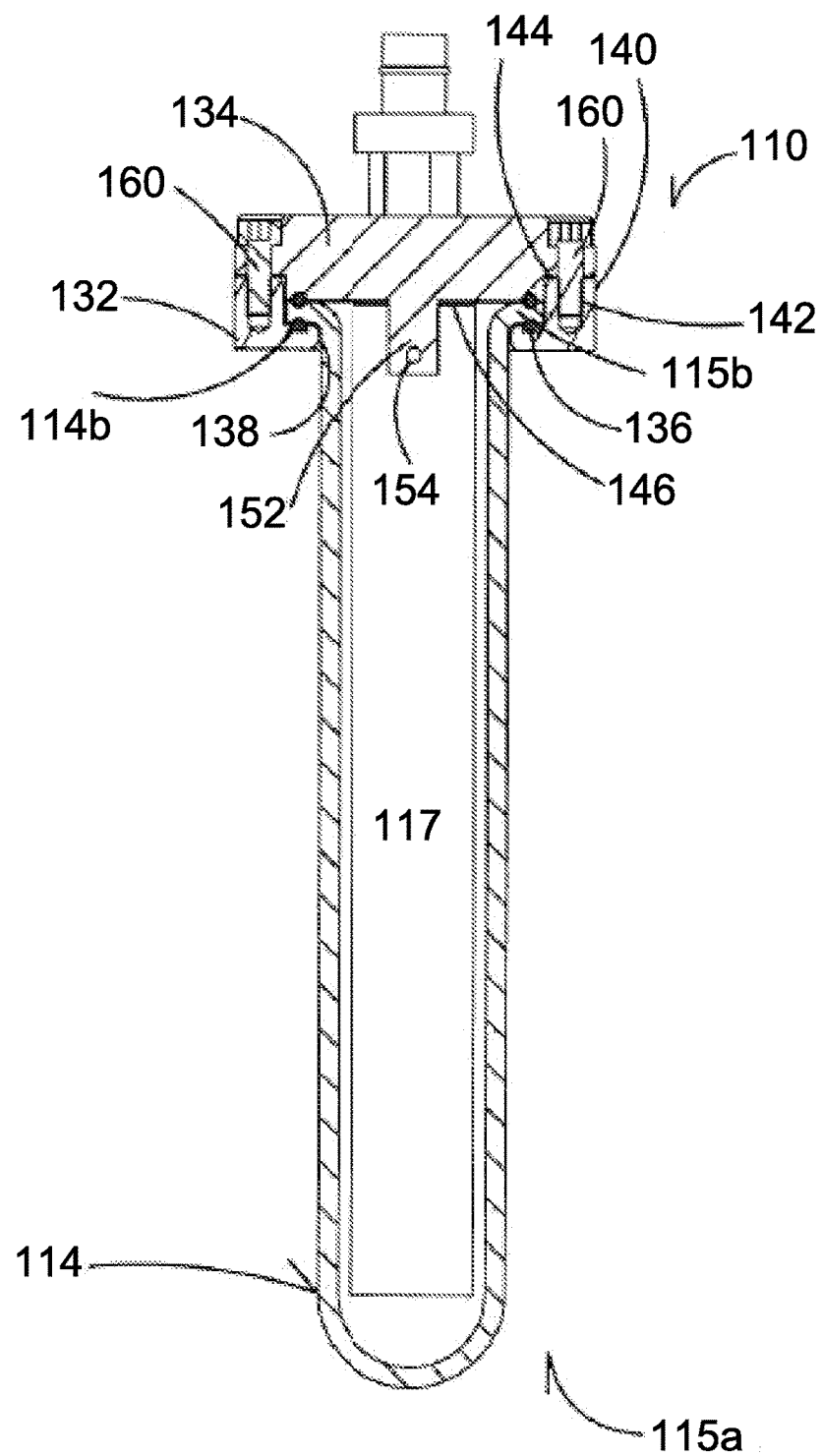
FIG. 9 is a sectional view of a lighting assembly for use in an ecosystem.
Figure 10:
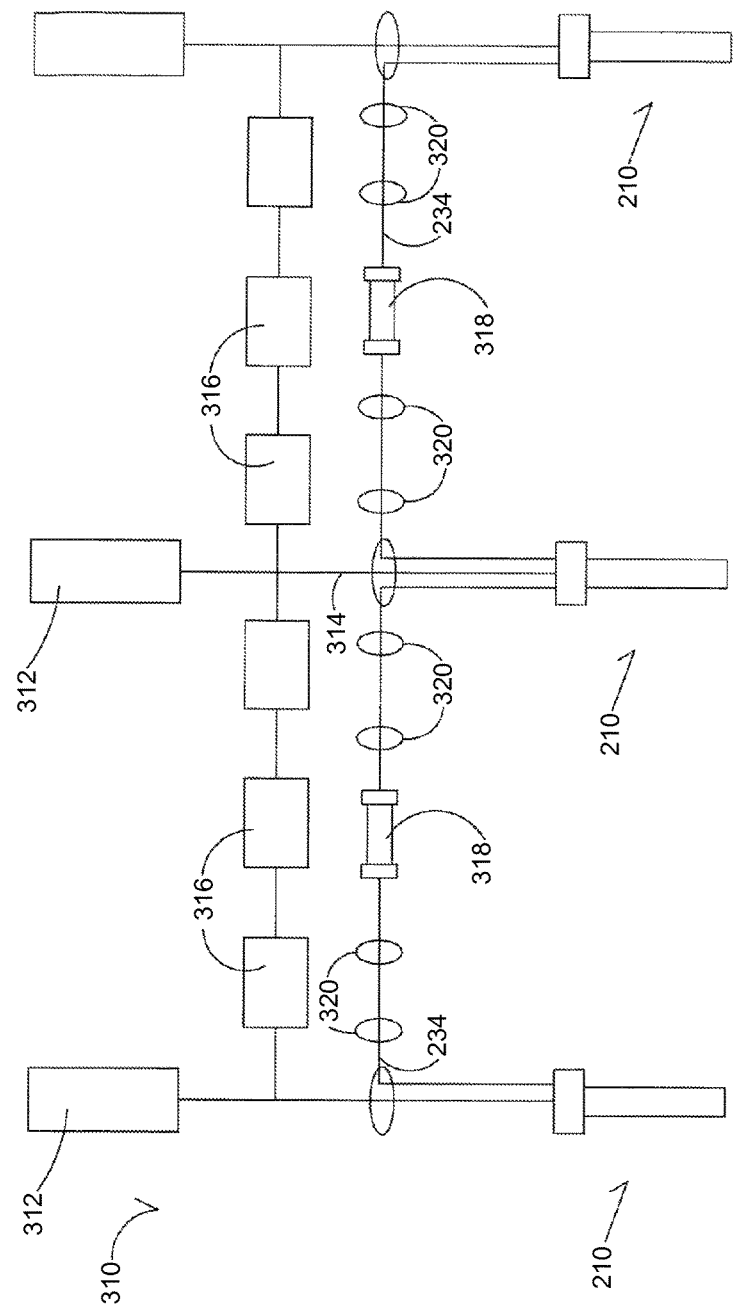
FIG. 10 is a side plan view of a buoy system of a lighting assembly for use in an ecosystem.

The figures show a lighting assembly 10 to be used in an ecosystem 12 that can be either naturally occurring or a natural ecosystem created outdoors in nature, or a man-made ecosystem created indoors. For example, the naturally occurring ecosystem can include a pond, creek, lake, man-made waterway, river, sea, ocean or the like that receives direct lighting from the sun. A man-made ecosystem is one made indoors or within a dwelling, and is either an aquarium, or other indoor aquatic breeding structure that does not directly receive lighting from the sun. Instead, lighting is provided only through windows, interior lighting or the like.

The lighting assembly 10 includes a light source capsule that in one embodiment has a capsule or vessel 14 that in one embodiment extends from a closed first end 15a to an opened second end 15b. In a preferred embodiment the vessel 14 is a glass tube. In another embodiment the vessel is square or other shape and made of a clear material to allow the passage of light. The vessel in another embodiment can be made of a material or color, or alternatively have a coating that diffuses light, changes the color of light or materially alters light disposed therethrough.

The vessel 14 surrounds and encloses a substrate 16 that can be of any size or shape. In one embodiment the substrate 16 is rectangular in shape and elongated the length of the vessel. In a preferred embodiment the substrate is a printed circuit board (PCB). Electrically connected to the substrate 16 is a power input 18 that in a preferred embodiment is an AC input and in another embodiment is a DC input. The input current is conditioned by driving circuitry 20 that includes a rectifier 21, at least one transistor 22 and a resistor 24. Protection circuitry such as a fuse or MOV also can be provided as needed. The driving circuitry conditions current for a plurality of light emitting diodes 26. The light emitting diodes 26 can be arranged in series, in series with the driving circuitry 20, in parallel, in parallel with the driving circuitry 20 or in any manner to produce light based on the power input 18 provided, whether AC or DC. In a preferred embodiment the driving circuit 20 and LEDs 26 are arranged as taught in U.S. Patent Publication No. 2011/0210678 by Grajcar, which is incorporated fully herein.

A medium 28 is disposed within the vessel 14 that surrounds the substrate 16. In one embodiment the medium 28 is a fluid and preferably is mineral oil. However, the fluid within the vessel 14 may be selected based on a variety of factors, including specific gravity of the material (e.g., less than the buoyancy created by air in the capsule), heat conductivity, and transparency to light at different wavelengths. The fluid (e.g., oil) within the vessel 14 may thus be selected to maximize heat transfer, to have a specific molecular weight, and/or to have a particular composition.

The medium 28 in one embodiment is clear to allow the passage of light therethrough, though the medium may be altered to be different colors or to have different characteristics to alter the light emitted by the LEDs 26 in order to create different color or wavelengths of light being diffused and emitted from the vessel. The main function of the medium 28 is to transfer heat from the driving circuitry 20 and LEDs 26 to the vessel 14 and thus to the water of the ecosystem 12.

An end cap 30 is removably secured to the opened second end 15b of the vessel 14. Specifically the end cap 30 is of size, shape and design to enclose the opened second end 15b in a sealing manner to prevent seepage of the medium 28 into the water of the ecosystem 12 while preventing water and contaminants carried therein from entering the vessel 14 and damaging the electronics and circuitry 16, 18, 20, 21, 22, 24 and 26. Simultaneously the end cap 30 has electrical wiring 32 disposed therethrough to provide electrical connection between the electronics and circuitry 16, 18, 20, 21, 22, 24 and 26 and an external power source 34. The end cap 30 is designed to provide a sealing connection between the end cap 30 and wiring 32 again to prevent water and contaminants from entering the vessel 14.

A control system 36 is electrically connected to the electrical wiring 32 to provide a user interface to control the operation of the LEDs 26. The control system includes, but is not limited to an on/off switch 38, dimming controls 40, light color controls 42 that in one embodiment is a function of the dimming controls 40 and flicker or light duration control 44 that controls the duration of light emitted by the LEDs 26.

Thus, the lighting assembly 10 optionally has different, independently controllable LEDs 26 so that light having different wavelength spectra can be produced at different positions along the light fixture or light assembly 10 (e.g., different spectra can be produced by lights located at different depths, different spectra can be produced by lights located at different locations, different spectra can be produced depending on a time of day, time of year, or ambient natural light reaching a particular depth in a pond, or the like).

The color of the lights inside the tube or vessel 14 are selected depending on the species of fish or shell fish to be influenced. Different colors affect the growth of different algae or aquatic animals. Adjusting the spectra of lighting can also compensate for differences in latitudes (how much light is reflected, on average, is a function of latitude), incident light on water of an ecosystem 12 such as a pond (e.g., whether the pond is outside under natural light or under a roof), or other factors. For ponds of differing depths, the LEDs 26 may be arrayed from the surface of the pond to the bottom of the pond. At different depths, the light intensity and color may be varied.

For example, outdoor ponds may have lighting designed to supplement or augment the natural lighting incident on the pond. Thus, at the surface of the pond during daylight, less light intensity may be required to be produced by the light fixture, and the light provided may only supplement the spectra filtered by the water. Deeper into the water, more light intensity may be needed and a broader spectra lighting may be needed to provide more broad spectra due to the filtering of the water.

Normally, algae only grow near the surface of the pond because that is where the light that is necessary for growth (photosynthesis) is available. By using additional lighting (including lighting directly within the pond), the lighting assembly 10 can increase the volume of water exposed to light by creating shafts where the light reaches deeper, thus allowing the algae to also grow along the length of the light tube or around the light point source deeper in the water—adding sunlight to more of the water.

The light spectra or intensity may alternatively or additionally be adjusted throughout the circadian day. For example, using independently controllable LEDs 26 arrayed from the surface of the water to the bottom of a pond, or alternatively at a point source (e.g., a single light fixture) within the pond, the intensity and spectra of the light can be adjusted throughout the day. For lighting fixtures or assemblies 10 located closer to the surface, the fixtures may not need to be on during a sunny day (or may have their lighting intensity or spectra adjusted). However, on a cloudy day, in the morning or evening (e.g., at times when greater light is reflected off the surface of the water due to the angle of the sun being low and approaching the critical angle of the water) or at night, the intensity and spectra can be adjusted, for example to increase the brightness and/or spectra adjusted to compensate for different colors of light not penetrating into the water.

For such purposes, a lighting system or assembly 10 may include one or more light sensors 46 electrically connected to the control system 36. In one embodiment the sensors 46 are located at the surface of the water of the ecosystem 12 such as a pond or within the pond, and which are used to measure a natural light intensity and/or spectrum and adjust the lighting intensities and/or spectra of lighting fixtures in the system.

A vessel angle control 48 additionally can be part of the control system 36 that causes mechanical movement of the light assembly 10 to be directed at different angles in the water of an ecosystem 12 or pond. Adjusting for the direction of the light, the light can be adjusted to shine "down" or towards a deeper part of the pond (for example, to stimulate the growth of oysters, clams or scallops), to shine across or towards parts of the pond having similar depths as the light (to influence fish), or to shine up or towards the surface of the pond (for creatures which tend to feed on the surface, like frogs). The directional adjustments may also be performed using a Fresnel or other light directing materials/constructs to direct light in a specific direction.

An anchoring system 50 in one embodiment suspends the lighting assemblies 10 from the surface of the water. Lighting fixtures or assemblies specifically hang from a floating mesh 52. The mesh 52 floats at or near the surface of the pond, and provides a two dimensional matrix from which light fixtures 10 hang into the water. The light fixtures 10 in one embodiment are configured to be heavier than water (or to be weighed), so as to sink in water and into the pond or other ecosystem 12 and be suspended from the floating mesh 52 with a suspension system 54. Multiple light fixtures 10 can be connected along a single cable or suspension member 56 originating from a point on the floating mesh, such that the lighting assemblies 10 provide light at multiple different depths below the origination point.

In another embodiment the lighting assemblies 10 hang from the floating mesh 52 in the water. The suspension member 56 such as cables and/or cords set the depth of the lighting assembly 10. In one embodiment the suspension system 54 includes a cable retraction/retention mechanism 58 and/or a power cord 60. The retraction/retention mechanism 58 (if the power cord 60 is also bearing the weight of the lighting apparatus) floats or holds the excess cable/power cord 60 to allow the length to be adjusted up or down. The wiring 32 that powers the lighting assembly 10 in one embodiment makes up part of the mesh 52 that holds the suspended lighting assemblies 10 in position.

Alternatively, the mesh 52 does not float and instead sinks or is anchored at or near the bottom of the pond, provided a two dimensional matrix from which light fixtures 10 can float up in the water. The light fixtures 10 are configured to be lighter than water, which in one embodiment is accomplished by connecting the vessel 14 to a floating device 62 or floater, so as to float up the vessel 14 in the water and thus anchored by the mesh 52.

Alternatively, the light fixtures 10 are mounted on a stake 64 or other support that sits on the bottom of the pond and holds the light figures at specified distances above the bottom of the pond. Multiple light fixtures 10 are connected along a single cable or stake 64 originating from a point on the mesh 52 (e.g., the light fixtures may be provided at regular 1 meter intervals along the cable/stake 64), such that the light assemblies 10 provide light at multiple different depths above the origination point. In one embodiment the stake 64 is telescoping, which allows the vessel to be positioned at the specific depth of the water of an ecosystem or pool is being maintained and/or allows the lighting to be adjusted as the depth of the pool varies due to any number of reasons, such as environmental reasons.

Alternatively the vessel 14 is simply staked to the bottom of the pond. To avoid puncturing a pond liner, the vessel 14 is on, part of or secured to a standard 66 resting on the bottom of the pond (on the liner, for example). Where standards 66 are used instead of stakes to support the lighting in the water, the standards 66 also play a secondary role of providing habitat to aquatic animals. For example, the standards 66 are optionally designed to provide a variety of underwater structures and overhangs that may be used by aquatic animals seeking shelter.

Alternatively, top lights, if exposed during a drought or low water conditions can be independently controlled (e.g., turned off) to reduce energy use. The light assembly 10 rests on a light pole which does not penetrate or damage the liner. The wiring can simply rest along the floor (or may be suspended like wiring between telephone or power poles). A light assembly 10 can adjust the color spectra, or wavelength of the light. The light has different spectra which can be selectively activated to promote growth of different algae, animal species, etc.

Optionally, a cleaning system 70 is provided for the vessel 14. In one embodiment a layer 72 of bio-fouling substance is applied to the surface to the lighting assembly 10 (such as a bio-fouling substance which prevents algae growth on the lighting figure, but does not affect aquatic animals). The bio-fouling substance or treatment may be applied to the surface to the submerged lighting fixture 10 in order to prevent (or retard) the growth and/or attachment of organisms to the fixture. The bio-fouling substance may be a simple silver emitting material, a surfactant, a hydrophobic material, or any other appropriate material or surface treatment. In one example, a material or treatment generally used to prevent algae growth in swimsuits and/or on the bottom of boats is used to reduce growth on submerged items.

Alternatively the cleaning system 70 is a mechanical wiper 74 used to keep the light transmission area (e.g., a window or surface area through which the light is transmitted) clear of growth. The wiper is secured to the vessel 14 and functions to clean the exterior of the vessel as a result of the movement of the wiper 74 along the exterior of the vessel 14.

The other figures show an alternative embodiment of the invention. In an embodiment a lighting assembly 110 is again used in an ecosystem 112 that can be either naturally occurring or a natural ecosystem created outdoors in nature, or a man-made ecosystem created indoors. For example, the naturally occurring ecosystem can include a pond, creek, lake, man-made waterway, river, sea, ocean or the like that receives direct lighting from the sun. A man-made ecosystem is one made indoors or within a dwelling, and is either an aquarium, or other indoor aquatic breeding structure that does not directly receive lighting from the sun. Instead, lighting is provided only through windows, interior lighting or the like.

The lighting assembly 110 is a light source capsule that in one embodiment has a capsule or vessel 114 that in one embodiment extends from an open first end 115a to a second opened second end 115b. In a preferred embodiment the vessel 114 is a glass tube. In another embodiment the vessel is square or other shape and made of a clear material to allow the passage of light. The vessel 114 in another embodiment can be made of a material or color, or alternatively have a coating that diffuses light, changes the color of light or materially alters light disposed therethrough.

The vessel 114 has a vessel wall 114a that surrounds and encloses a substrate 116 that can be of any size or shape. In one embodiment the substrate 116 is rectangular in shape and elongated the length of the vessel 114. In a preferred embodiment the substrate 116 is a printed circuit board (PCB). In the embodiment of the other figures first and second substrates 116a and 116b are secured to and engage an elongated primary heat sink 117 disposed between the first and second substrates 116a and 116b to provide a thermal path from the substrates 116a and 116b to the primary heat sink 117. The heat sink 117 preferably is made of metal and includes ridges that assist in the conveyance of heat away from the substrates 116a and 116b. While metal is preferred, any material that can be used to convey heat from the substrates 116a and 116b is contemplated by this disclosure.

In this embodiment fasteners are disposed through openings in the substrates 116a and 116b and engage nut elements to secure the substrates 116a and 116b to the heat sink 117. While in this embodiment a screw and nut type fastener is provided, other fasteners 117 can be used without falling outside this disclosure.

Electrically connected to each substrate 116a and 116b is the power input 118 that in a preferred embodiment is an AC input and in another embodiment is a DC input. The input current is conditioned by the driving circuitry 120 that provides current for a plurality of light emitting diodes 126. The light emitting diodes 126 can be arranged in series, in series with the driving circuitry 120, in parallel, in parallel with the driving circuitry 120 or in any manner to produce light based on the power input 118 provided, whether AC or DC. In a preferred embodiment the driving circuit 120 and LEDs 126 are arranged as taught in U.S. Patent Pub. No. 2011/0210678 to Graj car, which is incorporated fully herein.

A medium 128 is disposed within the vessel 114 that surrounds the substrates 116a and 116b. In one embodiment the medium 128 is a fluid and preferably is mineral oil. However, the fluid within the capsule 110 may be selected based on a variety of factors, including specific gravity of the material (e.g., less than the buoyancy created by air in the capsule), heat conductivity, and transparency to light at different wavelengths. The fluid (e.g., oil) within the capsule 114 may thus be selected to maximize heat transfer, to have a specific molecular weight, and/or to have a particular composition.

The medium 128 in one embodiment is clear to allow the passage of light therethrough, though the medium may be altered to be different colors or to have different characteristics to alter the light emitted by the LEDs 126 in order to create different color or wavelengths of light being diffused and emitted from the vessel. The main function of the medium 128 is to transfer heat from the driving circuitry 120 and LEDs 126 to the vessel 114 and thus to the water of the ecosystem 112.

In one embodiment heat is conveyed to the vessel wall to cause the wall to be at least 60° C. in order to kill any algae or plant life that attempts to grow on the outer vessel wall 114a. In this manner the outer vessel wall 114a does not need to be cleaned and plant life or algae is unable to prevent light from entering the water.

An end cap 130 sealingly encloses the open first end 115a. The end cap 130 has first and second sections 132 and 134 with the first section 132 being generally a ring with an interior annular flange 136 surrounding and opening 138 that receives the vessel 114 such that in one embodiment the vessel 114 has an annular flange 114b that has an outer diameter that is greater than the diameter of the opening 138 such that the annular flange 114b of the vessel 114 engages the top of the annular flange 136 of the end cap 130 to hold the vessel 114 within the first section 132 of the end cap 130. Disposed about the periphery 140 of the first section 132 of the end cap 130 are a plurality of openings 142 therein.

The second section 134 is generally T-shaped with a top planar surface 144 having an annular flange 146 extending therefrom of size and shape to matingly fit within the opening 138 of the first section 132. Specifically the annular flange 146 engages the top surface of the annular flange 114b of the vessel to secure the annular flange 114b of the vessel 114 between the first and second sections 132 and 134. The top planar surface 144 also has first and second central openings 148 and 150 on either side of an elongated connector 152 extending from the top planar surface 144. The elongated connector 152 optionally has an opening 154 disposed therethrough that aligns with an opening in substrates 116a and 116b to secure the end cap 130 to the substrate 116. Surrounding the periphery 156 of the second section 134 are a plurality of openings 158 that align with the openings 142 of the first section 132 such that fasteners 160 are disposed through both openings 142 and 158 to sealingly secure the first and second sections 132 and 134 and secure the vessel 114 therein. In this manner the ingress of water within the vessel 114 is prevented. Optionally sealing members 161 may be used to provide additional sealing to prevent water from entering the vessel 114.

First and second connectors 162 and 164 are disposed through the openings 148 and 150 in the top planar surface 144. In one embodiment the first and second connectors 162 and 164 are heyco connectors, or at least one is a heyco connector. In another embodiment bulk head connectors are used. In particular the connectors 162 and 164 are of size and shape to be received within the openings 148 and 150 to provide a sealing connection therein such that wiring 166 is disposed through the openings 148 and 150 for electrical connection to the substrate 116. The wiring is then connected to a power source to provide electricity to the substrate.

In one embodiment the individual lighting assembly 110 has an anchoring system 310. The anchoring system 310 includes a plurality of larger buoys 312 in spaced relation to one another and preferably approximately twenty feet between the larger buoys 312 with the each larger buoy 312 aligned with and directly attached with an attachment member 314 to the lighting assembly 110. Spaced between each larger buoy 312 and thus each lighting assembly 110 are a plurality of smaller buoys 316 that are preferably spaced apart approximately five feet from one another or from an assembly 110. An electrical connector 318 electrically connects the wiring 166 of an assembly 110 with ring members 320, that preferably are nylon and with five per assembly 110 surrounding the wiring 166 between the assemblies 110. In this manner if a single assembly 110 malfunctions, it can be replaced at the connector 318 without the need to replace an entire strand of assemblies 110.

In operation the lighting assemblies 10 or 110 are placed in water of a predetermined ecosystem 12. The assemblies are positioned in a predetermined position in the water by an anchoring system 50 or 310 to optimize the growth of aquatic life within the ecosystem 12. The assemblies 10 are then turned on by using a control system that controls the coloring, intensity, light duration and angular position of the assembly 10 or 110 to be adjusted based on the predetermined aquatic life within the ecosystem 12 or 112 to maximize the growth, yield and physical makeup of the predetermined aquatic life within the ecosystem.

Thus presented is the ability to provide spectra-compensating illumination at a variety of depths in order to encourage and enhance the growth of aquatic animals and/or algae. The color/wavelength spectrum provided may be adjusted based on a variety of factors, including the natural illumination available at the chosen depth, the wavelength spectrum of natural light that is generally found at the chosen depth, the particular needs of the aquatic animals and algae, or the like.

Specifically, spectra-compensating illumination is designed to adapt to animal need. Therefore, the optimum lighting conditions, such as light color/wavelength, intensity and duration is predetermined for each animal and the type of algae that is in a predetermined ecosystem 12. Once the effects on animal behavior and algae is understood, the lighting assembly can either be specifically manufactured to present an assembly having the spectra, intensity and duration needs of the ecosystem or a lighting assembly 10 can be controlled by the control system 36 to provide this output. In this manner the most beneficial of those spectra and conditions is used to further enhance and optimize output of the system used to breed and raise the aquatic animals.

This also includes the concept of accelerating or regulating algae growth. When light is introduced into non-circulating water which has a high nitrogen/$CO_2$ concentration, the light accelerates algae growth, growth that consumes the $CO_2$ and nitrogen. The light may thus be used to reduce the $CO_2$/nitrogen (nitrites) concentration, by encouraging the consumption of the $CO_2$ and nitrogen by algae. As such, lighting assemblies 10 act as an apparatus that is used to lower and/or regulate the $CO_2$ and nitrogen levels in aqua ponds, so as to increase the oxygen levels in the aqua ponds.

The frequencies/wavelengths of sunlight that produce (or permit, cause, enhance, encourage, or favor) photosynthesis can be filtered out by the water and algae found in a pond, such that photosynthesis may not occur deep in the pond. The lighting assemblies 10 may thus be provided that are tunable to produce the frequencies/wavelengths of light required for photosynthesis in water regardless of water depth, sunlight penetration, etc. The lighting assemblies 10 increase the exposure of algae to light by exposing the algae to more photons. The light can be introduced directly into the water to avoid any of the light being reflected from the surface of the water, and thus avoid any reflection of light incident on the water surface at an angle exceeding the critical angle. The light can be used to promote algae growth, and can form part of an apparatus to get the nitrogen and/or $CO_2$ out of the water. The light can alternatively (or additionally) be provided from above the water.

Plants such as algae also require a dark period and individual plants each have an optimum light and dark duration or period. This is discussed further in U.S. Provisional Patent Application No. 61/698,074, which is incorporated in full into this application. By using the light duration control 44 of the control system 36 this period may be predetermined and individual assemblies controlled to produce this duration as described in full in the '074 application. Thus algae production is maximized based on predetermining the type of algae presented and its reacts to different lighting parameters and then manufacturing the assembly to meet these parameters or setting an assembly via the control system 36 to meet these parameters.

In addition to applications in aquaculture, the light may be used in other applications to promote algae growth and/or the scavenging or consumption of Nitrogen/$CO_2$. For example, the light may be used in water treatment plants, wastewater treatment applications, pond cleaning applications, or the like.

Also presented is an assembly and method that improves animal growth, which feed on algae, which need light/nitrogen to grow. Therefore, in order to improve animal growth, lighting is used to control the amount of algae available to the animals at different depths and locations.

The lighting assemblies 10 also attract insects to the water surface. The underwater lighting assemblies 10 can also be used to attract insects to the surface of the water, and the insects can then be eliminated by natural biological processes (drowning, decomposition, and or eating). Thus additional food sources are provided.

Further, because of features such as filling the vessel 14 or capsule with a type of medium 28 such as fluid, like mineral oil, multiple LED devices 26 may be placed within a heavy weight glass tube or other vessel 14 and function efficiently. Specifically, the medium oil transfers heat from the LED devices and drivers (or other circuits) to the glass and then to the water. The combination of glass and oil allows the light sources to be cooled into the ambient water, thus enabling the light sources to be run at much higher light outputs (or at higher power levels) than if they were other types of lights or if the tube were filled with air and prevents overheating of the circuitry.

In sum, LEDs 26 located underwater may be used to resolve some or all of the problems discussed. The assemblies 10 can be installed at any economically reasonable depth, such that the growth and presence of beneficial algae at the installed depth becomes possible notwithstanding the presence of light-blocking contamination covering the LEDs or simply the depth of the water. In order to provide maximal algae growth in an ecosystem 12 such as a pond, a lighting system 10 for the pond includes lights arrayed throughout the pond. The lights 10 are distributed throughout the pond, so as to include lights located at different locations within the volume of the pond (e.g., to include lights at different locations of the footprint of the pond and at different pond depths). The orientation and/or grid of light fixtures can be of different sizes and dimensions depending on the depth of the growing pool or pond, the shape of the pool or pond (along a natural coast line, for example), type of water (salinity or opacity), or the size of the growing space. In this manner and as described above the lighting assemblies 10 can be tailored to any ecosystem 12 and type of aquatic life to be grown and either manufactured or actuated to provide an optimized growing based on the use of light. Thus, at the very least, all of the stated objects have been met.

What is claimed:

1. A lighting assembly comprising:
a first vessel having a closed end, an open end and an open interior adapted to be submerged within water of an ecosystem;
a first heat sink at least partially disposed through the open interior of the first vessel;
a first substrate having driving circuitry thereon engaging the first heat sink and disposed within the first vessel to provide a thermal path for heat from the circuitry to the first heat sink;
at least one lighting device electrically connected to the driving circuitry on the first substrate to emit light within the water of the ecosystem;
a first end cap sealingly enclosing the open end of the first vessel to provide a water tight seal between the first end cap and the first vessel;
said first end cap having an opening disposed therethrough for sealingly receiving a first connector that is electrically connected to the substrate to prevent the ingress of water within the first vessel;
wherein the first connector has a first wire that a attaches to a first buoy hold the first vessel in spaced relation to the first bouy and is connected to a replacement connector;
a second vessel having a closed end, an open end and an open interior adapted to be submerged within water of an ecosystem;
a second heat sink at least partially disposed through the open interior of the second vessel;
a second substrate having driving circuitry thereon engaging the second heat sink and disposed within the second vessel to provide a thermal path for heat from the circuitry to the second heat sink;
at least one lighting device electrically connected to the driving circuitry on the second substrate to emit light within the water of the ecosystem;
a second end cap sealingly enclosing the open end of the second vessel to provide a water tight seal between the second end cap and the second vessel;
said second end cap having an opening disposed therethrough for sealingly receiving a second connector that is electrically connected to the substrate to prevent the ingress of water within the second vessel;
wherein the second connector has a second wire that attaches to a second buoy to hold the second vessel in spaced relation to the second buoy and is connected to the replacement connector to allow the first vessel to be replaced without replacing the second vessel.

2. The lighting assembly of claim 1 wherein the lighting elements are light emitting diodes.

3. The lighting assembly of claim 2 wherein the lighting elements are a predetermined color.

\* \* \* \* \*